United States Patent [19]

Kovár et al.

[11] Patent Number: 4,772,250
[45] Date of Patent: Sep. 20, 1988

[54] VARIABLE TRANSMISSION GEAR, PARTICULARLY FOR BICYCLES

[75] Inventors: Josef Kovár; Karel Novotn; Pavel Wallensfels; Jirí Snízek, all of Prague; Rudolf Sída, Cheb; Petr Pavlata, Prague, all of Czechoslovakia

[73] Assignee: Kovodruzstvo Mlada Boleslav, Vyrobni Druzstvo, Mlada Boleslav, Czechoslovakia

[21] Appl. No.: 51,881

[22] Filed: May 15, 1987

[30] Foreign Application Priority Data

May 16, 1986 [CS] Czechoslovakia ............... 3564-86

[51] Int. Cl.⁴ .......................................... F16H 55/52
[52] U.S. Cl. ..................................... 474/47; 474/49
[58] Field of Search ............... 474/47, 49, 52, 53, 474/56, 57

[56] References Cited

U.S. PATENT DOCUMENTS 3,995,508 12/1976 Newell ............................. 474/50
4,493,678 1/1985 Husted ........................... 474/49 X Primary Examiner—Thuy M. Bui
Attorney, Agent, or Firm—Klein & Vibber

[57] ABSTRACT

Variable transmission gear particularly for bicycles comprising a transmission element such as a chain or a belt which is in engagement with a driving and a driven rosette, one rosette consisting of two parts adapted to be mutually shifted along straight guidings, the axis of said guidings being parallel and passing beyond the axis of supporting shaft.

5 Claims, 4 Drawing Sheets

VARIABLE TRANSMISSION GEAR, PARTICULARLY FOR BICYCLES

BACKGROUND OF THE INVENTION

The invention relates to a variable transmission gear with a transmission element such as a chain or belt, which transmission element is in engagement with a driving and a driven rosette, one rosette connected with a carrier from which or to which a torque is transmitted, whereby said rosette is formed by segments guided slidably with respect to the carrier.

At actually known embodiments of variable transmission gears the rosette consists of a number of parts which in case of a change of the transmission ratio are radially shifted with respect to or from the center of the rosette. Radial guiding means have to be provided for the shifting of individual parts of the rosette and also additional means are used, usually a spindle mechanism of an additional plate with a spiral groove, into which individual parts of the rosette are engaging. These arrangements have the drawback of an application of a large number of components of the transmission gear, whereby they are relatively expensive both in construction and in manufacture.

Another drawback of these variable transmission gears is the limiting of the extent of changes of the transmission ratio due to the limit of length of guidings of segments by a central supporting bolt.

It is thus impossible to obtain at these mentioned variable transmission gears the advantages of oval rosettes where in the course of a single revolution of the supporting shaft the length of the power arm on the rosette is cyclically changing, so that it is possible to synchronize the maximum power generated by the cyclist with the maximum transmission ratio in the course of the one revolution of the shaft as is the case at systems known by the name of "biopace".

At other known constructions of variable transmission gears the individual segments are arranged rotatably on a carrier. The rotational arrangement of segments is more demanding on an accurate guiding of segments and a lower stiffness is mostly caused thereby. Another drawback of rotational arrangements at a variable transmission gear is the circumstance that by this construction a constant prior required adjustment of the crank with respect to a chosen point on the rosette within the whole range of gear shifting is not achieved.

SUMMARY OF THE INVENTION

It is an object of this invention to provide a variable transmission gear of simple design with a small number of component parts where the advantage of oval rosettes would be obtained, whereby at any change of the transmission ratio the adjustment of the position of the crank with respect to the chosen position of the rosette would remain constant.

According to this invention, the rosette is formed by two segments which are by means of a carrier kinematically linked by straight guidings, the axis of which guidings passing beyond the axis of the supporting shaft, whereby the axis of said guidings are parallel. The segments are at their mutually facing parts provided with parting surfaces, which are at least partly parallel with the axis of the guidings and are in sliding contact either mutually or with a straight sliding surface formed on the supporting shaft. A sliding couple formed by a guiding element and a guiding groove can be arranged between the segment and the carrier and a control couple formed by a control bolt and a control groove can be arranged between the segment and the control plate.

An advantage of the variable transmission gear according to this invention is its simplicity of construction and the possibility to utilize the "biopace" system while maintaining a constant adjustment of the crank with respect to the chosen position of the half axle of the rosette. Another advantage is the possibility of a wide range of variations of the transmission ratio due to the arrangement of guidings of segments beyond the axis of the supporting shaft and the possibility of an increase of the stiffness of segments which are in mutual engagement or in engagement with the supporting shaft.

BRIEF DESCRIPTION OF THE DRAWINGS

Examplary embodiments of a variable gear according to this invention are shown in attached drawings where.

DETAILED DESCRIPTION

Figure 1:
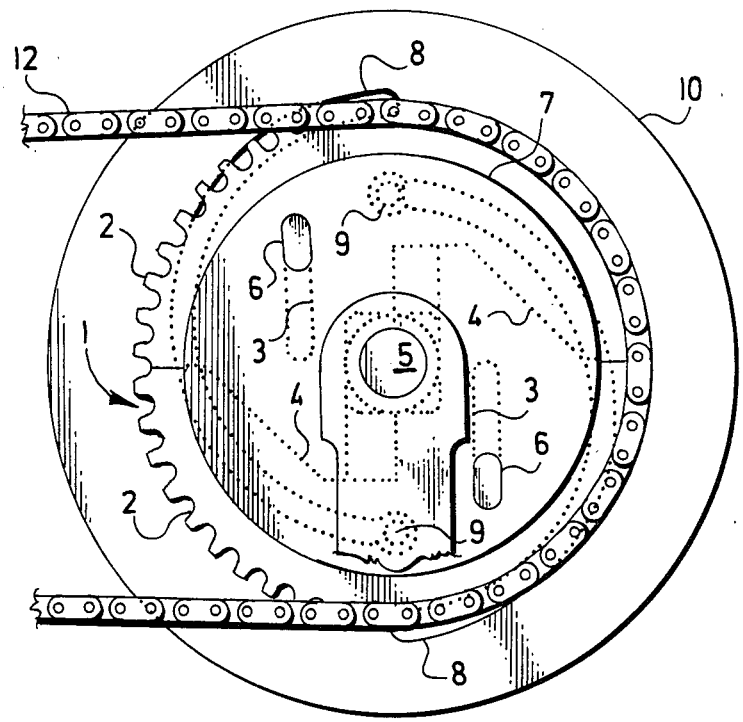
FIG. 1 is an elevation of one embodiment of a variable transmission gear.
Figure 2:
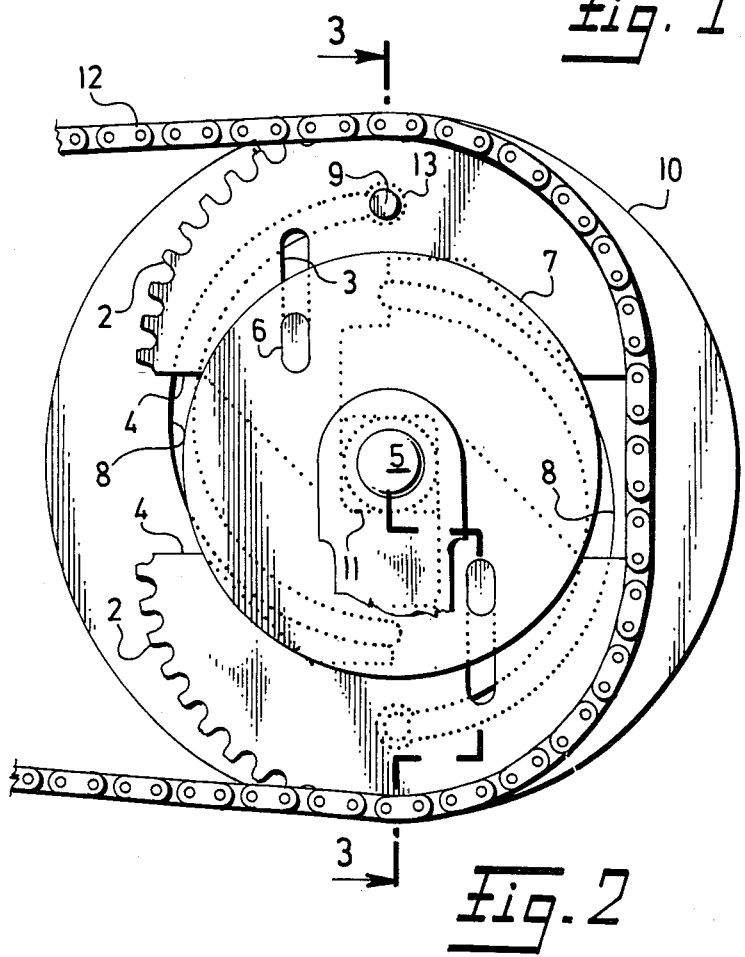
FIG. 2 is an elevation of the gear from FIG. 1 in the position of a maximum transmission ratio.
Figure 3:
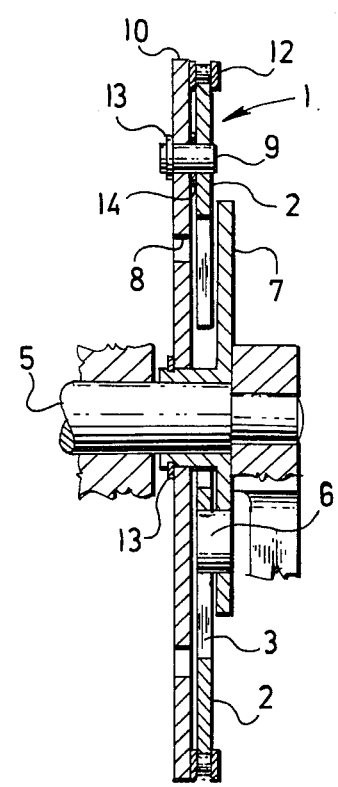
FIG. 3 is a sectional view thereof, the section taken along planes indicated in FIG. 2 by the staggered line A—A, FIG. 4 an elevation of parts of control means for gear shifting.

With reference to FIGS. 1, 2, and 3 a rosette is shown in engagement with a chain 12 is formed by two segments 2 arranged between a carrier 7 and a control plate 10. The carrier 7 is supported on the supporting shaft 5 non rotatably, whereas the control plate 10 is mounted rotatably on a sleeve of the carrier 7. The segments 2 are on mutually facing places provided with parting surfaces 4 which are partly in contact with a guiding prism 11 which is formed by a part of the sleeve of the carrier 7. Guidings 3 are provided in the segments 2, with guiding elements 6 firmly connected with the carrier 7 being in engagement with said guidings 3. Control pins 9 are fixed to the segments 2 engaging into a control groove 8 of the control plate 10. The parting surfaces 4 of the segments 2 are in case of a minimum transmission ratio bearing against each other, and in case the segments 2 are distant from each other, parts of their surfaces which are parallel with the guidings 3 are in contact with the supporting shaft 5 or with the guiding prism 11. All guidings 3 of segments 2 are paralleled and their axis are passing beyond the axis of the supporting shaft 5.

The axial distance between the rosette 1, the carrier 7 and the control plate 10 is secured by distance plates 14 and by a safety rings 13 arranged on control pins 9

Figure 4:
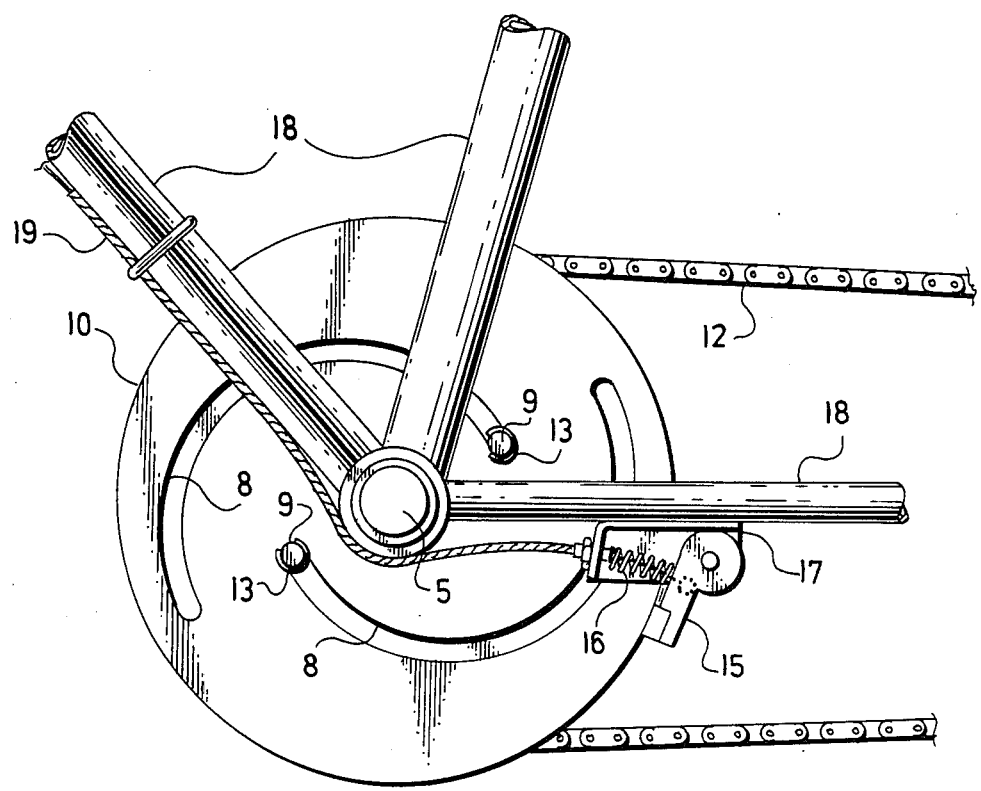

FIG. 4 shows a control device formed by a control lever 15 rotatably supported on a holder 17 fixed to the frame 18 of the bicycle. The control lever 15 is connected to a Bowden cable 19 and is maintained in its starting position by a return spring 16.

Figure 5:
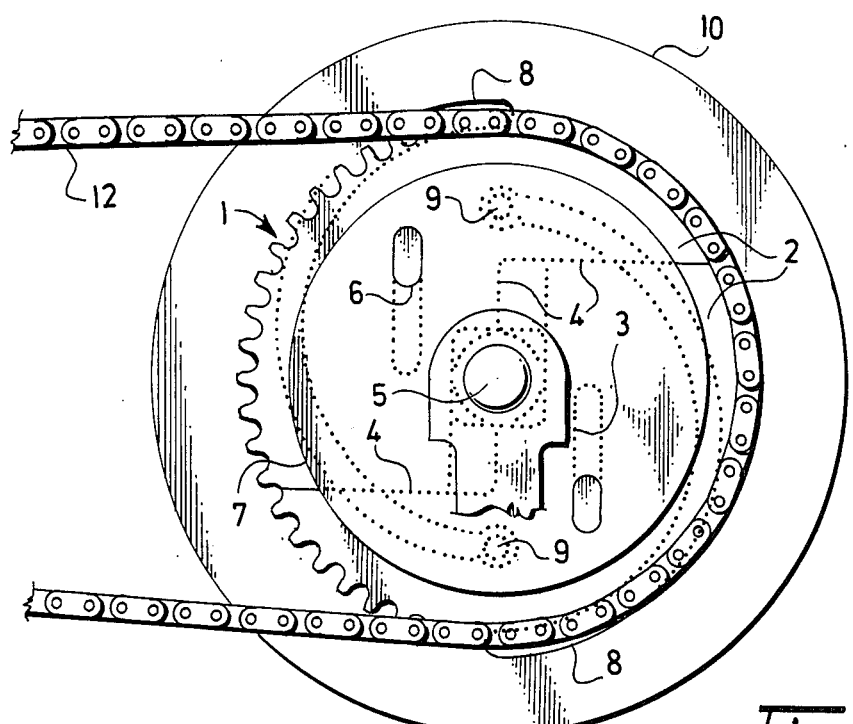
FIGS. 5 and 6 are elevations of an alternative embodiment of the variable transmission gear at minimum and maximum transmission ratio.
Figure 6:
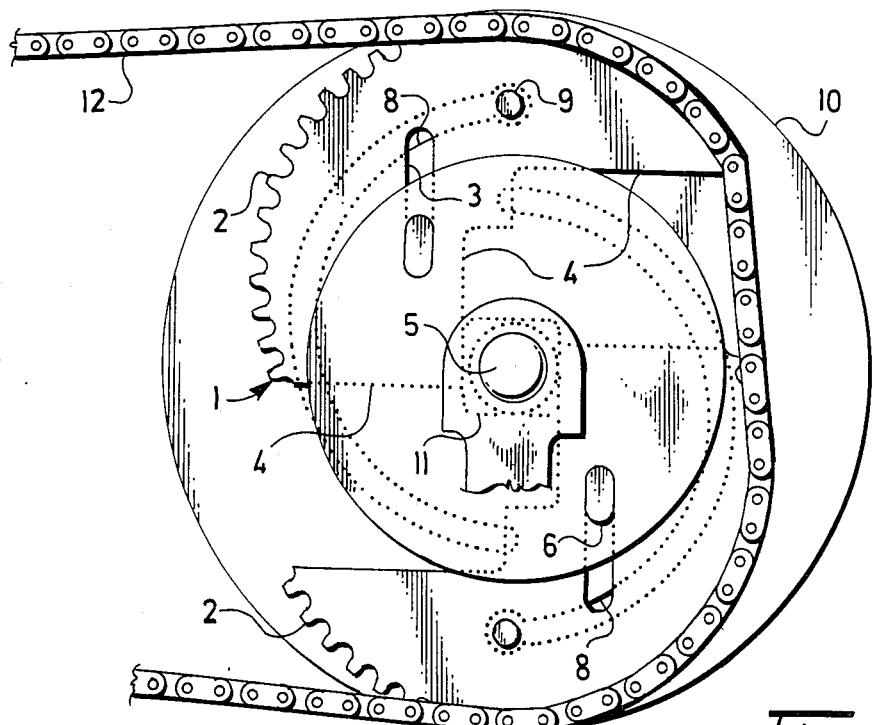

In an alternative embodiment shown in FIGS. 5 and 6, the parting surface 4 of the segments 2 are arranged differently.

Figure 7:
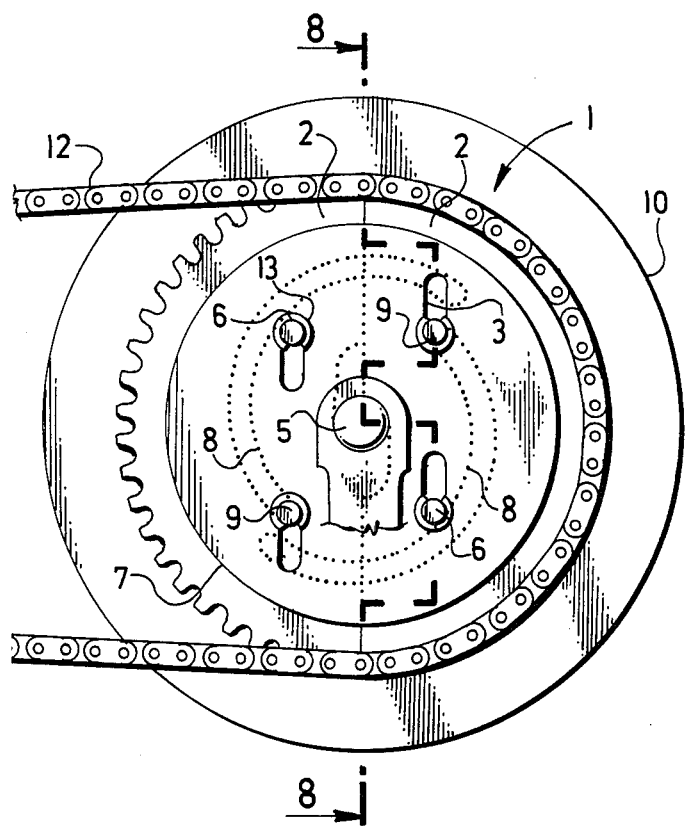
FIGS. 7 and 9 are elevations of another alternative embodiment of the variable transmission gear at minimum and maximum transmission ratio.
Figure 8:
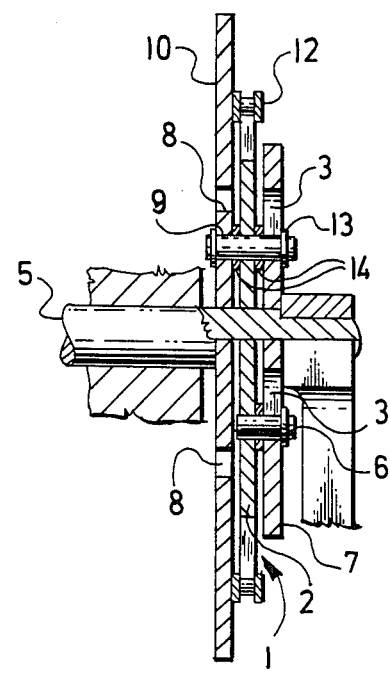
FIG. 8 is a sectional view of this alternative embodiment, the section taken along planes indicated in FIG. 7 by the staggered line A—A.
Figure 9:
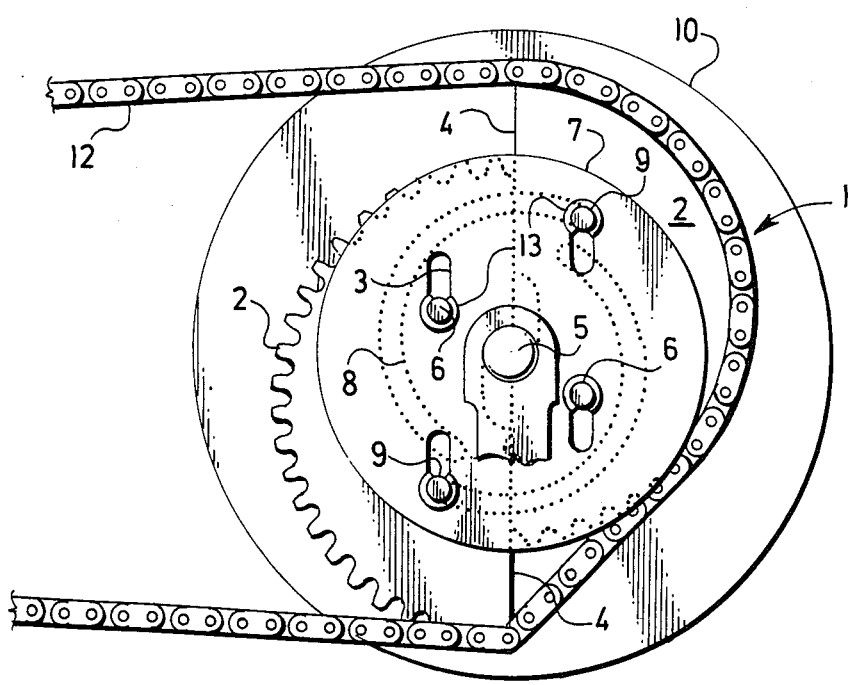

According to the alternative embodiment indicated in FIGS. 7, 8, and 9 nearly the whole parting surface 4 of both segments 2 is parallel with the guiding 3 and the difference against above described constructions is that in case of a change of the transmission ratio, the distance of extreme points on the circumference of segments is changing whereas at the earlier mentioned constructions the distance of opposite central points of the circumference of segments 2 are changed. The control plate 10 and the rosette 1 are rotatably supported directly on the supporting shaft 5. The control pins 9 engage at this alternative also into the guiding 3 of the carrier 7 and contributes to the guiding of segments 2. The parting surfaces 4 of both segments 2 are mutually in sliding contact. At all mentioned embodiments it is possible to provide the control groove in the segments of the rosette and the control pin in the control plate.

In case the supporting shaft 5 is rotated, the carrier 7 takes along by way of the guiding element 6 and the guiding 3 the rosette 1 and furthermore by way of the control pin 9 and the control groove 8 the control plate 10. In case the ratio of the transmission has to be changed, the control lever 15 is pressed against the circumference of the control plate 10 by pulling the Bowden cable 19, due to what the control plate 10 is braked and the rosette 1 is turned with respect to the control plate 10. Due to this turning, the control pin 9 is shifted in the control groove 8 from its position more close to the axis of the supporting shaft 5 to a position more distant from the axis of the supporting shaft 5. The segment 2 are thus removed from each other to a more distant position whereby the segments 2 are guided by means of guiding 3 and the guiding element 6 and by parts of parting surfaces 4 which are in contact either with the guiding prism 11 or with the supporting shaft 5. The increase of the transmission ratio is finished by release of the control lever 15, preferably by contact of the control pin 9 to the external end of the control groove 8. A different transmission ratio from a minimum to a maximum can be thus achieved by different braking of the control plate 10. In case the transmission ratio has to be reduced, the control plate 10 is again braked by pull of the Bowden cable 19, pressing thereby the control lever 15 against the control plate 10. The supporting shaft 5 has to be turned against its original direction of rotation, so that the control pin 9 is shifted in the control groove 8 so that it is brought to a position more close to the center of the supporting shaft 5. The control pins 9 thereby take along the segment 2 toward a position corresponding to the minimum transmission ratio.

We claim:

1. Variable transmission gear particularly for bicycles, comprising
   a transmission element such as a chain or belt, and a rosette, said transmission element is in engagement with said rosette;
   a supporting shaft, having an axis; and a carrier adapted to transmit a torque, wherein said rosette is arranged on the supporting shaft which is operatively connected to the carrier;
   two segments, which form the rosette, are slidably guided with respect to said carrier; and straight guidings kinematically interconnect the segments to the carrier, said guidings each having an axis; and
   the axis of each of said guidings are mutually parallel and pass beyond the axis of the supporting shaft.

2. Variable transmission gear as in claim 1 wherein the segments are provided with mutually facing parts having parting surfaces, at least parts of said parting surfaces are parallel with the axis of said guidings.

3. Variable transmission gear as in claim 2 wherein a part of the parting surface of one segment is in contact with a part of the parting surface of the other segment.

4. Variable transmission gear as in claim 2, further comprising a sliding surface arranged on the supporting shaft, whereby a part of the parting surface of the segment is in contact with the sliding surface arranged on the supporting shaft.

5. Variable transmission gear as in claim 1, further comprising a guiding element, said guiding element, engaging with said guiding, forms with the guiding, a sliding couple between the segment and the carrier; a control groove and a control pin forms a part of a control, and said control is arranged on the segment

* * * * *